United States Patent
Heussner et al.

[11] Patent Number: 5,312,156
[45] Date of Patent: May 17, 1994

[54] CHILD RESTRAINT SEAT INCLUDING AUTOMATIC PIVOT HINGE

[75] Inventors: Edward R. Heussner, Warren; Jeffrey L. Goins, Sr., New Haven; Peter R. McCulloch, Grosse Pointe Woods, all of Mich.

[73] Assignee: Lear Seating Corporation, Southfield, Mich.

[21] Appl. No.: 959,570

[22] Filed: Oct. 13, 1992

[51] Int. Cl.$^5$ ............................................. A47C 15/00
[52] U.S. Cl. ................................. 297/238; 297/114; 297/230.14; 297/452.18
[58] Field of Search ............... 297/238, 232, 468, 464, 297/396, 408, 112, 114, 230.1, 230.14, 234, 452.18, 452.29, 452.48, 452.55

[56] References Cited

U.S. PATENT DOCUMENTS

| | | |
|---|---|---|
| 1,034,678 | 8/1912 | Berger et al. |
| 1,157,992 | 10/1915 | Lutz |
| 1,260,972 | 3/1918 | Faiella |
| 1,295,984 | 3/1919 | Haussinger |
| 1,965,048 | 7/1934 | Morris |
| 2,337,480 | 12/1943 | Logan |
| 2,436,294 | 2/1948 | Glatstein |
| 2,584,481 | 2/1952 | Mast et al. |
| 2,722,267 | 11/1958 | Liljengren ........................... 297/396 |
| 2,966,201 | 12/1960 | Strahler |
| 3,897,974 | 8/1975 | Barecki ............................... 297/232 |
| 3,951,450 | 4/1976 | Gambotti ............................ 297/238 |
| 4,230,366 | 10/1980 | Ruda ................................... 297/487 |
| 4,533,176 | 8/1985 | Wyttenbach ....................... 297/238 |
| 4,541,654 | 9/1985 | Jonasson ............................. 280/801 |
| 4,555,135 | 11/1985 | Freeland ............................. 297/105 |
| 4,655,503 | 4/1987 | Kamijo et al. ..................... 297/238 |
| 4,664,443 | 5/1987 | Casale ................................. 297/238 |
| 4,690,449 | 9/1987 | Holman ............................. 296/65 R |
| 4,722,568 | 2/1988 | Irvin ................................... 297/238 |
| 4,749,229 | 6/1988 | Dorto .................................. 297/238 |
| 4,756,573 | 7/1988 | Simin et al. ........................ 297/250 |
| 4,900,086 | 2/1990 | Steward ............................. 297/238 |
| 4,900,087 | 2/1990 | Crisp .................................. 297/238 |
| 4,902,070 | 2/1990 | Casale et al. ....................... 297/238 |
| 4,913,498 | 4/1990 | Forlivio ............................. 297/488 |
| 4,936,627 | 6/1990 | Guim .................................. 297/238 |
| 4,943,112 | 7/1990 | Law .................................... 297/238 |
| 5,026,118 | 6/1991 | Vander Stel et al. .............. 297/338 |
| 5,035,465 | 7/1991 | Hanai et al. ....................... 297/238 |
| 5,061,012 | 10/1991 | Parker et al. ....................... 297/467 |
| 5,098,157 | 3/1992 | Surot .................................. 297/250 |
| 5,098,161 | 3/1992 | Minami et al. .................... 297/464 |
| 5,100,199 | 3/1992 | Vander Stel et al. .............. 297/238 |
| 5,106,158 | 4/1992 | Dukatz et al. ..................... 297/396 |

FOREIGN PATENT DOCUMENTS 0197167 10/1986 European Pat. Off. ............ 297/232

Primary Examiner—P. Austin Bradley
Assistant Examiner—James Miner
Attorney, Agent, or Firm—Reising, Ethington, Barnard, Perry & Milton

[57] ABSTRACT

A child restraint seat (22) is disposed in a cavity (20) of the backrest (14) in an adult passenger seat (10) for restraining a child in a vehicle. The child seat (22) comprises a seat portion (24) pivotal between a folded position recessed in the cavity (20) forming a lower portion of the adult backrest (14) and an unfolded position resting against the adult seat portion (12). A child backrest (26) is disposed in the cavity (20) and pivotal between a first position parallel with the inclined position of the adult backrest (14) and a second child backrest inclined position. The child seat (22) further includes a headrest (54) pivotal in an arcuate path about an axis of the adult backrest (14) between a folded position forming the upper portion of the adult backrest (14) and an unfolded position raised above the backrest (14) and forming an extended child backrest portion (26).

8 Claims, 4 Drawing Sheets

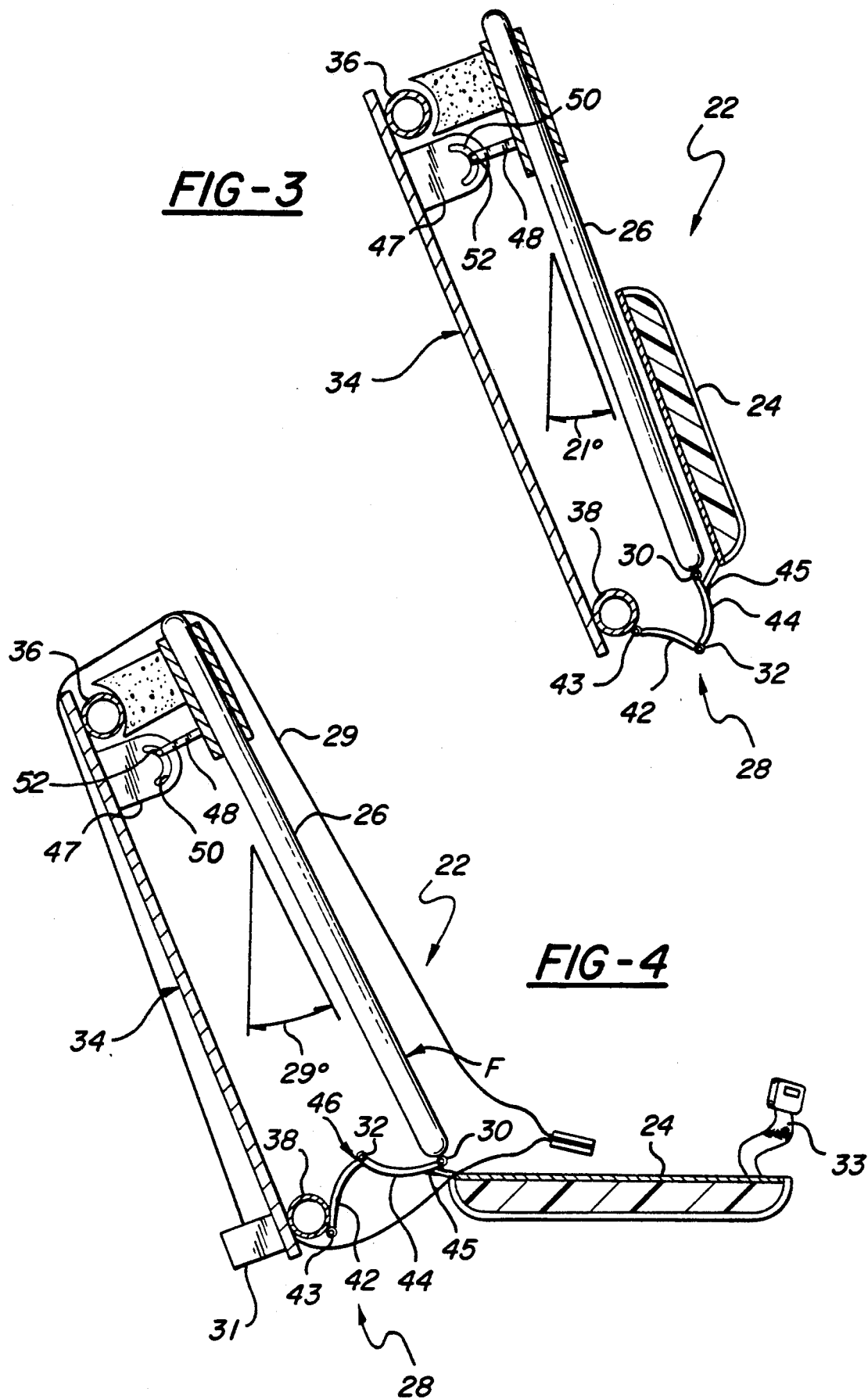

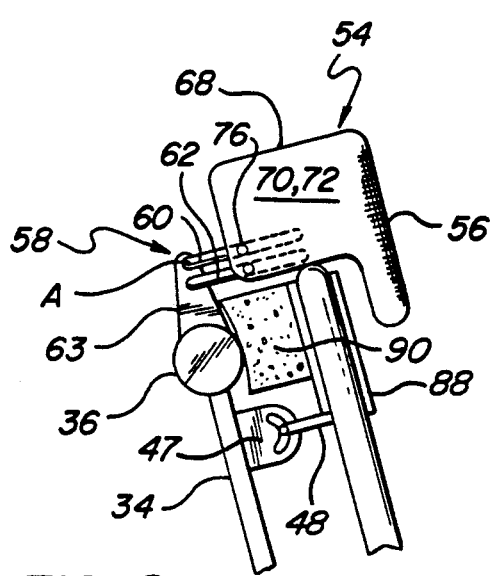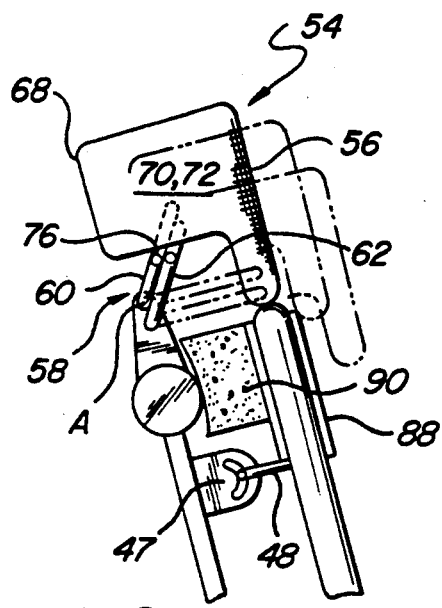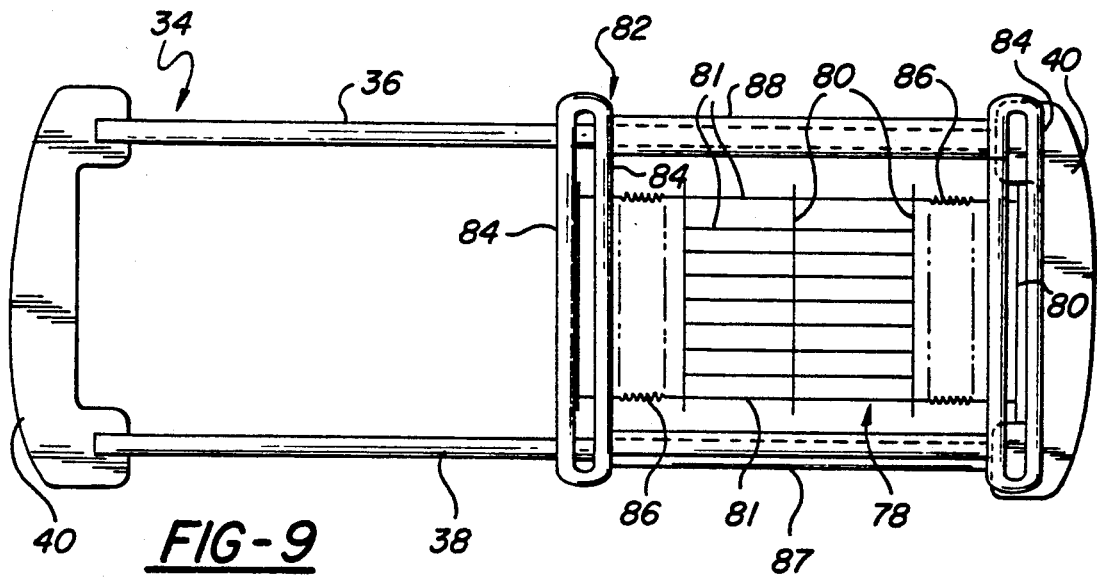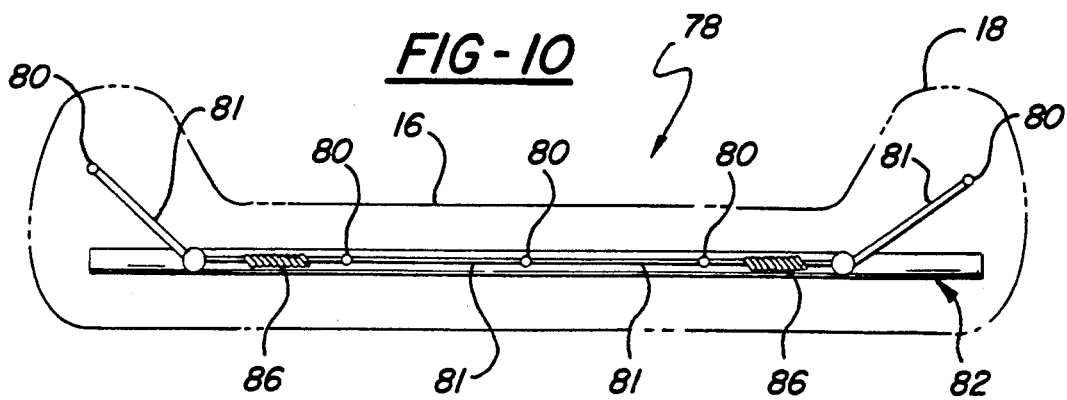

CHILD RESTRAINT SEAT INCLUDING AUTOMATIC PIVOT HINGE

FIELD OF THE INVENTION

The subject invention relates generally to a vehicle passenger seat assembly, and more specifically, to a vehicle passenger seat assembly having a child restraint seat disposed in the backrest cushion of the vehicle passenger seat for restraining a child in the vehicle.

DESCRIPTION OF THE RELATED ART

By way of background, it is becoming increasingly desirable for automotive vehicles to provide a child restraint seat disposed integrally in the adult passenger seat for restraining a child in the vehicle. It is further desirable to provide a child seat which folds or collapses to a storage position as part of the adult passenger seat such that the adult seat maintains its usefulness and yet the child seat is readily accessible.

For example, the U.S. Pat. No. 5,106,158 to Dukatz et al., issued Apr. 21, 1992 discloses a child restraint seat assembly disposed integrally within a backrest portion of an adult passenger bench-type seat. The child seat includes a fold down seat portion pivotally connected to a backrest portion by a flexible hinge member. The seat portion and backrest portion are recessed in a cavity in the adult seat backrest. The child seat also includes a fold-up headrest portion pivotally attached to the adult backrest and pivotal from a folded position recessed in the cavity forming a portion of the adult backrest and an unfolded position aligned with the child backrest.

Additionally, the U.S. Pat. No. 5,026,118 to Vander Stel et al., issued Jun. 25, 1991, discloses a child restraint seat also disposed in the backrest portion of an adult passenger seat. The child seat includes a seat portion pivotal between a folded position recessed in the adult backrest and an unfolded position seated against the adult seat portion. A restraint bar pivots downwardly from the adult backrest and extends radially outwardly therefrom to restrain the child in the seat. After the seat portion is pivoted to the unfolded use position, the child seat further includes a backrest portion which includes means for sliding the backrest along a track to a tilted position angled from the adult backrest for supporting the child in a desired inclined position.

However, it remains desirable to provide a readily accessible child restraint seat which is disposable in a cavity in the adult seat backrest portion while maintaining the structure support, comfort and integrity of the adult seat.

SUMMARY OF THE INVENTION

In accordance with the present invention, there is provided a child restraint seat for disposition in the backrest cushion of an adult passenger seat for restraining a child in a vehicle. An adult passenger seat includes a generally horizontal seat portion and a generally vertical backrest portion. A cavity is recessed in the face of the adult backrest portion for receiving the child restraint seat. The child seat includes a seat portion pivotally secured at one end to the adult passenger seat and pivotal between a folded position recessed in the cavity forming at least a portion of the adult backrest portion and an unfolded use position extending downwardly to a generally horizontal position against the adult seat portion. A child backrest portion is disposed in the cavity and includes a first end pivotally connected to the adult backrest for providing pivotal rotation of the child backrest about the first end between a first position parallel with the adult backrest and a second inclined position tilted outwardly to a predetermined child backrest angle. The child seat is characterized by including hinge means interconnecting the child seat portion and the second end of the child backrest portion for automatically pivoting the backrest from the first position to the second inclined position in response to pivotal rotation of the child seat portion from the folded position recessed in the cavity to the unfolded use position against the adult seat portion thus enabling a child to be positioned on the seat in an optimum inclined seating position.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a side cross-sectional view of the child restraint seat in a folded non-use position;

FIG. 4 is a side cross-sectional view of the child restraint seat in an unfolded use position;

FIG. 8A is a side view of the child headrest assembly in the folded position;

FIG. 8B is a side view of the child headrest assembly in the unfolded position and showing the arcuate path of pivotal rotation;

FIG. 9 is a front view of the main seat support frame and the secondary child seat support frame and suspension system pivotally coupled thereto; and FIG. 10 is a top view of the suspension system of the secondary child seat support frame.

DETAILED DESCRIPTION OF THE PREFERRED EMBODIMENT

Figure 1:
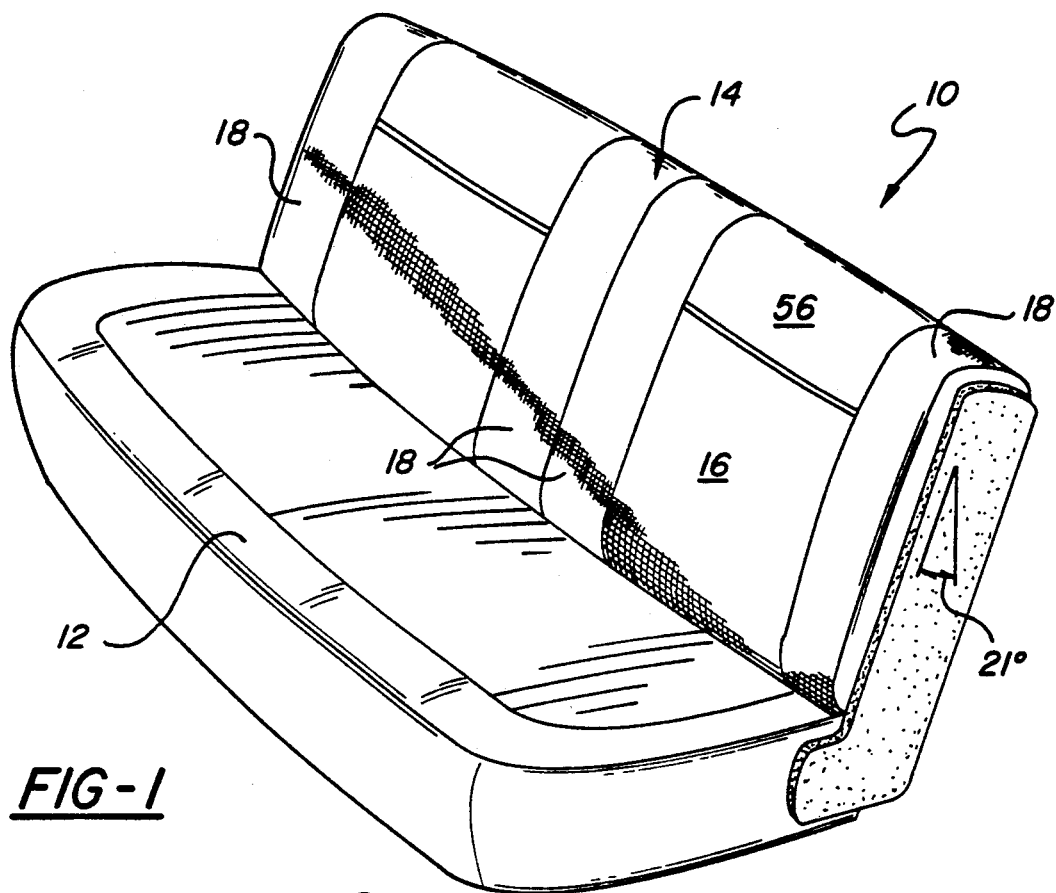
FIG. 1 is a perspective view of an adult passenger seat for use in a vehicle.

Referring to the Figures wherein like numerals indicate like or corresponding parts throughout the several views, FIG. 1 discloses an adult passenger bench-type seat generally indicated at 10 for use in a vehicle. The adult seat 10 includes a generally horizontal seat portion 12 and a generally vertical or upright backrest portion 14. As indicated, the backrest 14 is more specifically inclined from vertical at approximately 21 degrees, however, as can be appreciated, this inclined angle may vary significantly due to user adjustment or safety requirements. The backrest portion 14 includes a center back support area 16 and side bolsters 18.

Figure 2:
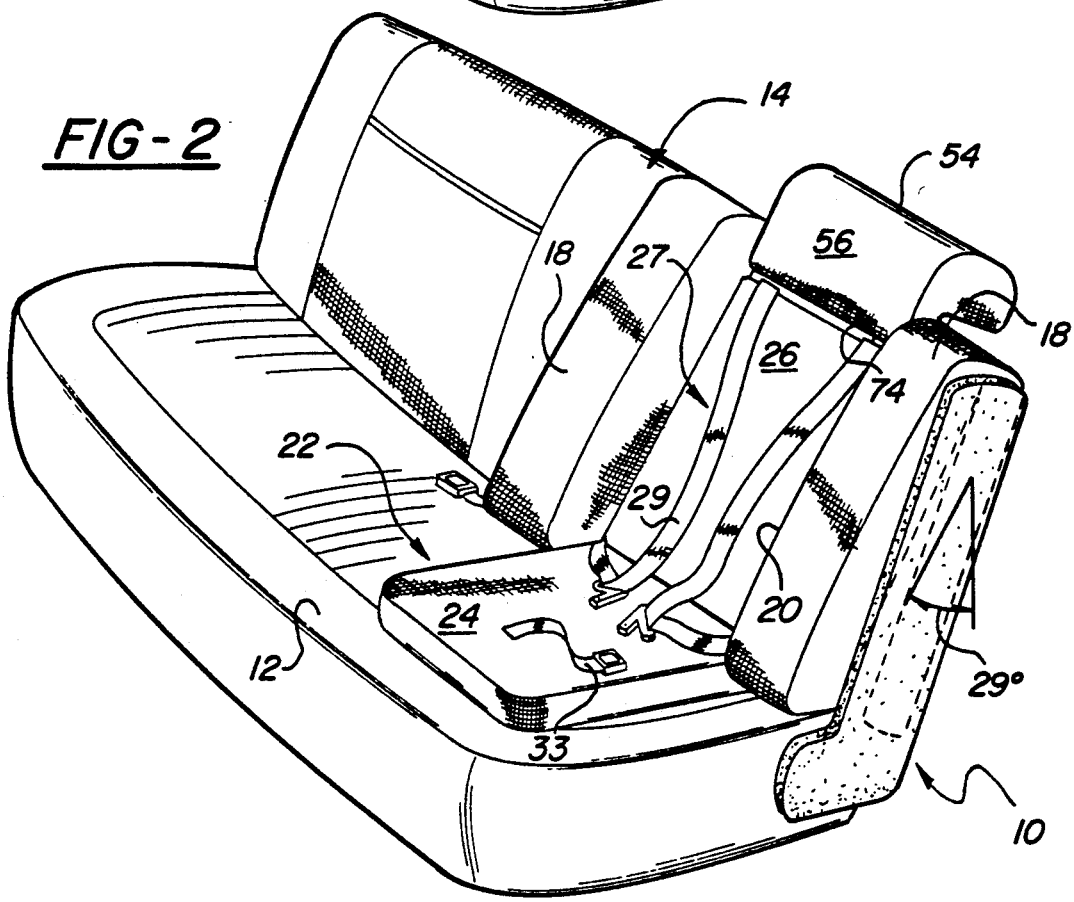
FIG. 2 is a perspective view of the adult passenger seat of FIG. 1 including a child restraint seat of the subject invention.

Referring to both FIGS. 1 and 2, the adult backrest further includes a cavity 20 recessed in the face of the adult backrest portion 14 for receiving a child restraint seat as generally indicated at 22. The cavity 20 is disposed between the side bolsters 18 and forms a portion of the adult backrest 14 extending from the seat portion 12 to the upper end of the backrest 14.

The child restraint seat 22 comprises a child seat portion 24 pivotally secure at one end to the adult passenger seat 10 and pivotal between a folded position recessed in the cavity 20 forming a lower portion of the adult backrest 14, as shown in FIG. 1, and an unfolded use position pivoted forwardly and downwardly and lying or resting parallel against the adult seat portion 12, as shown in FIG. 2. A child backrest portion 26 is disposed against the back wall of the cavity 20 and includes an upper end pivotally connected to the adult backrest 14 for providing pivotal rotation of the child backrest 26 between a first position parallel with the adult backrest 14 and a second inclined position tilted outwardly from the first position or adult backrest position to a predetermined child backrest angle, or inclined position, as shown in FIG. 2.

In the preferred embodiment of FIG. 2, the child backrest angle is approximately 29 degrees from vertical, however, as can be appreciated, the angle or inclined position may vary to meet various safety requirements and specifications.

The child seat 22 includes a safety belt harness system 27 having two shoulder harnesses 29 extending over the upper portion of the backrest 26 to a retractor 31, FIG. 4, and a center strap 33 extends through the seat portion 24 and is fixed to a portion of the main seat frame.

Referring to FIGS. 3 and 4, the child restraint seat 22 is characterized by including hinge means 28 interconnecting the child seat portion 24 and the lower end of the child backrest 26 for automatically pivoting the backrest 26 from the first upright position to the second inclined position in response to pivotal rotation of the child seat portion 24 from the folded position recessed in the cavity 20 to the unfolded use position resting against the adult seat portion 12 and thus enabling a child to be positioned on the seat 22 in an optimum inclined sitting position.

The hinge means 28 includes a first pivot 30 between the child seat portion 24 and the child backrest 26 to provide the pivotal rotation of the child seat portion 24 between the folded and unfolded positions. The hinge means 28 also includes at least a second pivot 32 between the second end of the child backrest 26 and the adult backrest 14 to provide for forward tilting of the child backrest 26.

Figure 6:
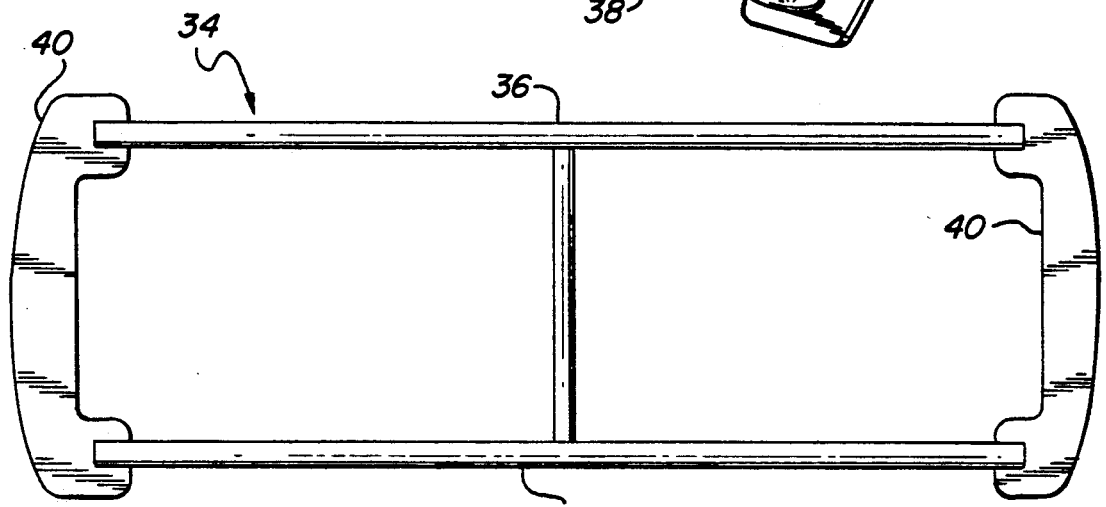
FIG. 6 is a front view of the main seat support frame of the adult seat backrest.

The adult backrest 14 generally includes a main support frame 34, also shown in FIG. 6, including an upper support beam 36, lower support beam 38 and side frame plates 40 interconnecting the upper 36 and lower 38 support beams. Referring again to FIGS. 3 and 4, the upper end of the child backrest 26 is pivotal about the upper support beam 36, as will be further discussed below, and the lower end is pivotally coupled to the lower support beam 38 by the hinge means 28.

More specifically, the hinge means 28 comprises a first arcuate linkage 42 pivotally connected at one end by pivot 43 to the lower support beam 38 and further pivotally connected at the opposite end at pivot 32 to a second arcuate linkage 44. The second arcuate linkage 44 is then also pivotally coupled at pivot 30 to the lower end of the child backrest 26. Finally, the opposite end of the second linkage 44 is fixedly secured by weld, or the like, at 45 to the child seat portion 24.

The hinge means 28 further includes locking means 46 for locking the child backrest 26 and child seat portion 2 in the tilted and unfolded positions respectively. The locking means 46 may obviously be accomplished by various means. In the preferred embodiment, the locking means 46 is incorporated in the arrangement of the pivot 32 between the first 42 and second 44 linkages. Specifically, as the child seat portion 24 is pivoted downwardly about the lower end of the child backrest 26 via pivot 30, the fixed mount 45 between the seat 24 and second arcuate linkage 44 forces the ends of the linkages 42,44 and interconnecting pivot 32 to press upwardly and thus extend or tilt the child backrest 26 forwardly to the inclined position as shown in FIG. 4. The pivot 32 has a stop created by the abutment of the ends of the linkages 42,44 which limits its range of pivotal movement and prevents the linkages 42,44 from extending any further upwardly than as shown in FIG. 4. Also, when the backrest 26 is tilted or extended forward to the inclined position the height or vertical position of the pivot 32 is above that of the support beam pivot 43 and the first pivot 30. As a result, if a force F is applied to the backrest 26, a resulting biasing forces acts upwardly on the linkages 42,44 and pivot 32. However, the stop or limited pivotal range in the pivot 32 prevents the linkages 42,44 from extending further upwardly and thus prevents the child seat 24 from collapsing into the cavity 20.

As previously mentioned, the upper end of the child backrest 26 is pivotal about the upper support beam 36. A support bracket 47 is fixed to the main support frame 34 and spaced below the upper support beam 36 and extends outwardly from the main seat support frame 34 to couple with an L-shaped pivot bracket 48 extending outwardly from the upper end of the child backrest 26. The pivot bracket 48 includes a guide pin 52 and the support bracket 47 includes an arcuate slot 50 for receiving the guide pin 52 to provide pivotal rotation of the child backrest 26 about the upper support beam 36. As the child seat portion 24 is pivoted downwardly, the lower portion of the backrest 26 is extended outwardly by linkages 42,44 to the inclined position. The upper portion of the backrest 26 is simultaneously pivoted through an arcuate path about the upper support beam 36 via the guide pin 52 sliding arcuately from end to end of the arcuate slot 50.

Referring to FIGS. 2, 8A and 8B, the adult backrest portion 14 includes a first lower portion indicated by the child seat portion 24 as described above and a second upper portion forming a child headrest 54 pivotal about an axis A between a folded position recessed in the cavity 20 forming the upper portion of the adult backrest 14 and an unfolded position pivoted upwardly and extending at least partially above the upper portion of the adult backrest 14 to form an extended child backrest 26 and/or child headrest 54. The second upper portion or headrest 54 includes a front face 56 forming a portion of the adult backrest 14 in the folded position and aligned in a parallel plane with the child backrest 26 forming an extended portion thereof in the unfolded position as shown in FIG. 8B.

The child restraint seat 22 is further characterized by including pivot means 58 interconnecting the second upper portion or child headrest 54 and the adult backrest 14 for pivoting the upper portion 54 in an arcuate orbital path spaced from the axis A from the folded position to the unfolded position to provide an extended child seat backrest height and headrest support. The pivot means 58 includes a pair of linkages 60,62 each having a first end pivotally coupled to a bracket 63 extending upwardly from the upper support beam 36 of the main support frame 34 and a second end pivotally coupled to the headrest 54.

The headrest 54 comprises a generally L-shaped shell 68 having first and second sides 70,72 and generally covered in a resilient foam material and fabric upholstery as is commonly known in the art. The headrest 54 is received in an upper L-shaped region 74 in the cavity 20, FIG. 2, to form a portion of the adult backrest 14. The linkages 60,62 are coupled on the opposite sides 70,72 of the shell 68 and included a control rod 76 fixed at each opposite end to the linkages 60,62 and extending therebetween to prevent torsional deflection of the shell 68 upon rotation from the folded to unfolded positions. As shown in FIGS. 8A and 8B, the arcuate pivotal movement of the headrest 54 provided by the pivot means 58 allows the structure of the pivot means 58 including the bracket 63 and linkages 60,62 to be positioned behind the child backrest 24 and generally seating area and thereby facilitates use of a structurally rigid pivot means 58 for positioning the headrest 54 in the desired folded and unfolded positions while preventing any contact of the rigid structure with any portion of the child occupying the seat; especially the child's head.

Figure 7:
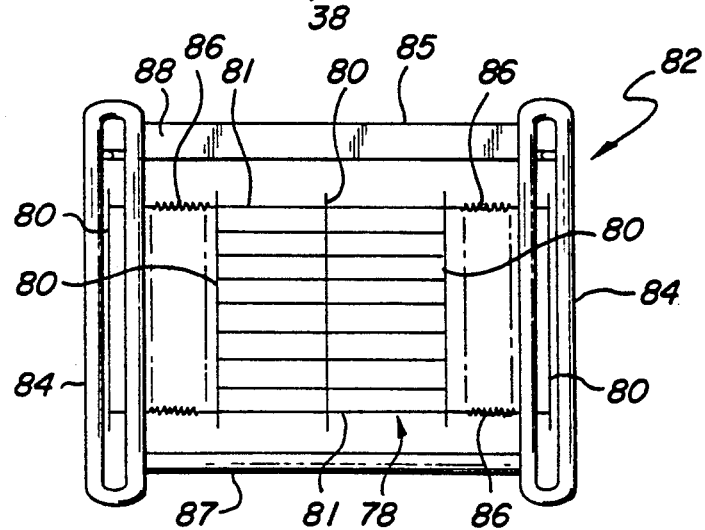
FIG. 7 is a front view of the secondary child seat support frame and suspension system.

As can be appreciated, each of the child seat portions 24 and backrest portions 26 are generally covered in a layer of resilient foam material and fabric upholstery to provide passenger comfortability to both the adult and child. However, the assembly is further characterized by one of the child seat portion 24 or backrest portion 26 including a suspension system as generally indicated at 78 in FIGS. 7, 9 and 10.

Figure 5:
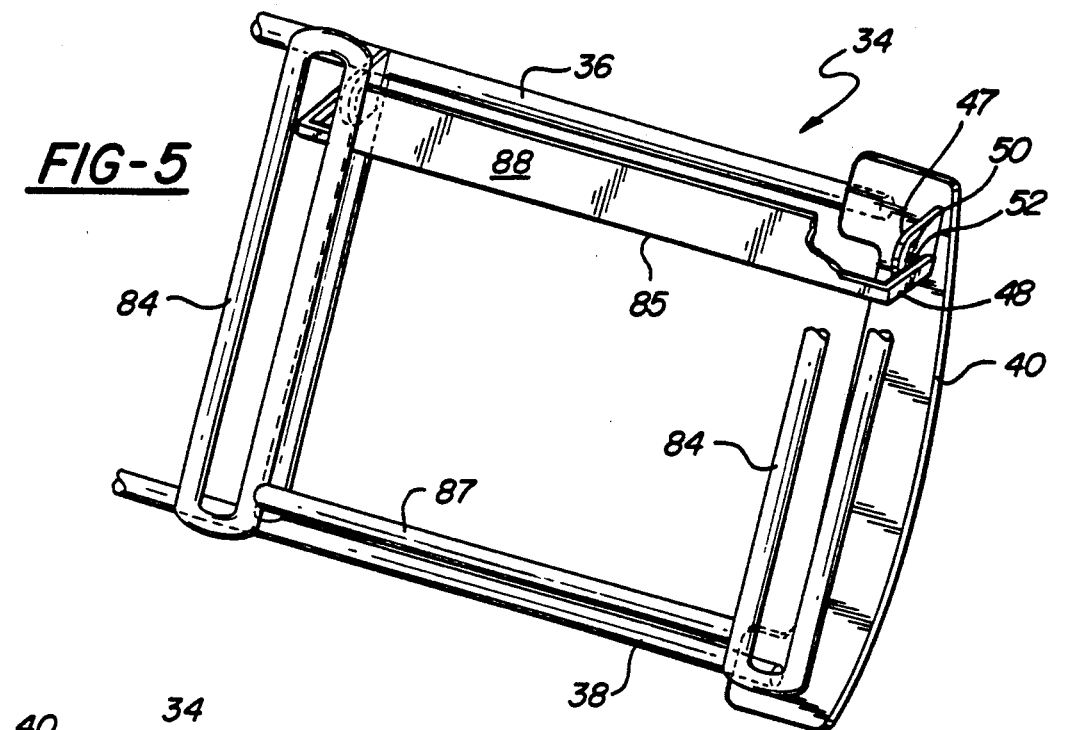
FIG. 5 is a partial perspective view of the secondary child seat support frame connected to the main seat support frame.

A secondary support frame 82 is disposed between the child backrest area and the main support frame 34. The secondary frame 82 includes a plurality of opposite side support bars 84 interconnected by upper 85 and lower 87 cross members to form a rigid framing. The secondary support frame 82 is pivotally coupled to the upper support beam 36 by the pivot coupling 47,48 as shown in FIGS. 4 and 5. A support bracket 47 extends outwardly from the upper cross member 85 and interconnects with the pivot bracket 48 as described hereinabove. The support bracket 47 and pivot bracket 48 are spaced below the upper support beam 36 thus defining the upper support beam 36 as the center of rotation of the secondary frame 82. That is, the arcuate slot 52 in the bracket 47 allows the secondary frame 82 to rotate or pivot about an axis defined by the upper support beam 36 upon movement from the upright to tilted positions. This allows the rigid structure of the pivot coupling 47,48 to be positioned outside of the general child seating area defined between the side support bars 84 and cross members 85,87 of the secondary frame 82 and thus eliminates any contact of the child with the rigid structural components of the seat.

Referring again to FIGS. 7, 9 and 10, the suspension system 78 includes a plurality of generally parallel resilient torsion bars indicated at 80 suspended by the secondary support frame 82 for providing resilient seat support in both the child seat 22 in the unfolded position and the adult backrest 14 when the child seat 22 is recessed in the cavity 20 in the folded position.

The suspension system 78 in the preferred embodiment is commonly referred to in the seating art as "Flex-o-lator" and comprises a plurality of parallel torsion bars 80 composed of a solid helical wrapping of paper filament or a single wire strand helically wrapped in paper filament. The strands are interconnected by a plurality of crossing wire strands 81 to form a resilient flex grid as shown in FIG. 9. The grid is then suspended by a plurality of springs 86 extending from the side support bars 84 of the secondary frame 82. As can be appreciated, the suspension system may take on many forms, configurations and utilize many different materials as are commonly known in the seating art. Also as shown in FIG. 10, an additional torsion bar 80 or flex wire may extend forwardly from the side support bars 84 to provide resilient support in the seat bolster areas 18.

The secondary support frame 82 remains independent from the main support frame 34 to allow the secondary frame 82 to be encapsulated in foam during the foam molding process. In other words, during manufacturing of the vehicle seat, the foam cushion portion is often molded from a liquid foam poured into a mold cavity to form the seat configuration. The process is generally referred to as "SURE-POUR" and is specifically described in the assignee's copending application Ser. No. 541,783. The "SURE-POUR" process allows the foam to be molded about the secondary frame 82, thus concealing the suspension system, eliminating seat width and forming an aesthetically appealing and comfortable adult and child seat. Further, as shown in FIG. 2, upon pivotal unfolding of the child seat portion 24 to the unfolded use position the entire backrest portion 14 formed by the secondary support frame 82 pivots to the inclined child seating position.

Finally, the secondary seat frame 82 includes a thin metal plate 88 forming at least a portion of the upper cross member 85 interconnecting the opposite side support bars 84. The plate 88 conceals or covers over the upper support beam 36 as shown in FIGS. 5 and 9. Referring to FIGS. 8A and 8B, an energy absorption material barrier 90 is disposed between the thin metal cover plate 88 and the upper support beam 36. The barrier 90 may be composed of any suitable energy or force absorbing material such as styrofoam, rubber, plastic, or the like, substance as is commonly known in the industry. The plate 88 and barrier 90 are seated in front of the main support frame upper beam 36 to absorb any forces exerted on the child seat backrest 26 and prevent contact of the child with the rigid support frame 36.

Therefore, it is important to note that each of the rigid fixed points of the seat support structure including the upper support beam 36 and secondary frame 82 are covered or spaced from contact with the child utilizing the seat by some type of energy absorption material or barrier. Furthermore, it is equally important to note that the pivotal connections between the child seat portion 24 and backrest portion 26 with the lower support beam 38 and between the headrest 54 and upper support beam 36 and finally between the backrest portion 26 and pivot bracket assembly 47,48 are each displaced at a position spaced behind and outside of the general child seating area defined between the side supports 84 of the secondary frame 82 and thus prevent any possible contact by the child occupying the seat.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A child restraint seat for disposition in the backrest cushion of an adult passenger seat for restraining a child in a vehicle comprising:

an adult passenger seat having a generally horizontal seat portion and a generally upright backrest portion, said backrest portion including a front face for supporting a passenger's back;

a cavity recessed in said front face of said adult backrest portion for receiving said child restraint seat;

a child seat portion having a first end pivotally coupled to said adult passenger seat and pivotal between a folded position recessed in said cavity forming at least a portion of said face of said adult backrest portion and an unfolded use position extending downwardly to a generally horizontal position against said adult seat portion;

a child backrest portion disposed in said cavity and pivotally connected to said adult backrest portion for providing pivotal rotation of said child backrest between a first position generally parallel with said adult backrest and a second inclined position tilted outwardly to a predetermined child backrest angle, said child backrest portion including an upper end and a lower end;

hinge means interconnecting said first end of said child seat portion and said lower end of said child backrest portion for automatically pivoting said child backrest portion from said first position to said second inclined position in response to pivotal rotation of said child seat portion from said folded position recessed in said cavity to said unfolded use position against said adult seat portion thus enabling a child to be positioned on the seat in an optimum inclined seating position;

pivot means spaced below said upper end of said child backrest portion for pivotally coupling said child backrest portion and said adult backrest portion and for extending said lower end of said child backrest outwardly away from said adult backrest while retracting said upper end of said child backrest into said cavity and towards said adult backrest upon said automatic pivotal movement of said child backrest from said first position to said inclined position.

2. A child restraint seat as set forth in claim 1 further characterized by said hinge means including a first pivot between said child seat portion and said lower end of said child backrest portion and at least a second pivot between said child seat portion and said adult backrest portion.

3. A child restraint seat as set forth in claim 2 further characterized by said hinge means including a first linkage having a first end pivotally coupled to said adult backrest and a second end connected to said second pivot.

4. A child restraint seat as set forth in claim 3 further characterized by said hinge means including a second linkage having a first end connected to said second pivot and a second end fixedly attached to said first end of said child seat portion, said second end further connected to said first pivot between said lower end of said child backrest and said first end of said child seat portion.

5. A child restraint seat as set forth in claim 4 further characterized by said adult backrest portion having upper and lower ends and including a main support frame having an upper support beam extending horizontally across said upper end and a lower support beam extending horizontally across said lower end of said adult backrest, said pivot means being spaced below said upper support beam and said hinge means pivotally coupled to said lower support beam.

6. A child restraint seat as set forth in claim 5 further characterized by including locking means for locking said child backrest and said child seat portion in said tilted and unfolded positions respectively.

7. A child restraint seat as set forth in claims 1 or 4 further characterized by said pivot means including a support bracket extending outwardly from said seat support frame and a pivot bracket extending rearwardly from said child backrest, said support bracket being coupled to said pivot bracket to provide a pivot spaced below said upper end of said child backrest.

8. A child restraint seat as set forth in claim 7 further characterized by one of said support bracket and said pivot bracket including an arcuate slot and the other including a guide pin received in said slot to provide pivotal rotation of said first end of said child backrest about the upper support beam of said adult backrest.

* * * * *